United States Patent [19]

Nockemann

[11] Patent Number: 4,795,711
[45] Date of Patent: Jan. 3, 1989

[54] FERMENTATION OF ORGANIC MATERIALS FOR PRODUCING HEAT AND FERTILIZER

[76] Inventor: Otto Nockemann, Homertskamp 10, D-5270 Gummersbach 1, Fed. Rep. of Germany

[21] Appl. No.: 928,845

[22] Filed: Nov. 7, 1986

Related U.S. Application Data

[62] Division of Ser. No. 465,046, Feb. 9, 1983.

[30] Foreign Application Priority Data

Feb. 9, 1982 [DE] Fed. Rep. of Germany ....... 3204471

[51] Int. Cl.[4] .......................... C12M 1/00; C05F 7/00
[52] U.S. Cl. ........................................ 435/316; 71/9
[58] Field of Search ............... 71/6, 8, 9; 435/287, 435/304, 305, 306, 307, 308, 309, 310, 313, 315, 316

[56] References Cited

U.S. PATENT DOCUMENTS

| 1,621,658 | 3/1927 | DeLape | 435/316 |
| 2,043,265 | 6/1936 | Boeder | 435/310 |
| 3,847,750 | 11/1974 | Ridgway, Jr. | 435/316 |
| 4,025,394 | 5/1977 | Young | 435/316 |
| 4,193,786 | 3/1980 | Brill | 71/9 |
| 4,204,959 | 5/1980 | Kreuzburg et al. | 71/9 |
| 4,286,066 | 8/1981 | Butler et al. | 435/316 |
| 4,298,693 | 11/1981 | Wallace | 435/316 |
| 4,483,704 | 11/1984 | Easter, II | 71/9 |
| 4,493,770 | 1/1985 | Moilliet | 435/316 |
| 4,670,397 | 6/1987 | Wegner et al. | 435/315 |

FOREIGN PATENT DOCUMENTS

2917048 4/1980 Fed. Rep. of Germany ... 435/287 X

Primary Examiner—Larry Jones
Attorney, Agent, or Firm—Toren, McGeady & Associates

[57] ABSTRACT

Organic material and animal excrement is fermented in an accelerated manner in closed systems in order to produce energy, such as biogas and heat, wherein, as a rule, the material is moved around or constantly shifted, respectively, in known devices. According to the invention, the material to be fermented, organic waste and excrement, preferably from large-scale animal maintenance, is brought together and fed to inclined shafts from above, wherein it sinks down by means of its own force of gravity and is mixed at intervals by means of a mixing angle attached at a chain hoist. The inclined bottoms of the shafts form the heat exchanger units, for which purpose the outer defining walls can also be used. The entire system is completely insulated and can be coated automatically from above.

12 Claims, 5 Drawing Sheets

FERMENTATION OF ORGANIC MATERIALS FOR PRODUCING HEAT AND FERTILIZER

This is a divisional application of application Ser. No. 465,046, filed Feb. 9, 1983.

BACKGROUND OF THE INVENTON

1. Field of the Invention

The invention relates to a method and the appertaining devices for aerobically fermenting organic materials, preferably agricultural and foodstuff waste products, including excrement, and simultaneously producing heat and high-grade biologically and hygienically acceptable fertilizer.

Such methods and the appertaining technical devices serve the purpose of decomposing—in an economical and environmentally acceptable manner—waste products resulting from agriculture and forestry, vegetable production and horticulture, landscape and part maintenance, as well as excrement, and the like, by means of aerobic fermentation, and of simultaneously producing a good fertilizer, as well as heat for heating purposes, or the like. There are extensive, many-sided and economically significant tasks here, specifically: to eliminate wastes from agriculture, timber and forest cultivation and from foodstuff, as well as, e.g., the great quantities of mowed material from road, park and landscape maintenance, and the like, in a more advantageous manner; to convert the great quantities of animal excrement—and to some extent also human excrement—in an environmentally acceptable manner so as to be free of harmful germs; that is, to produce a hygienically acceptable, biologically high-grade fertilizer for use in agriculture and forestry, vegetable production and horticulture, and as commercial goods in moist and dry form; and to obtain heat in these decomposition processes, wherein all methods must be carried out economically, in an environmentally acceptable manner and without objectionable odor for the population.

2. Discussion of the Prior Art

Very many individual suggestions have aleady been proposed in this regard; however, they are either not universal enough or are too costly in terms of money and energy or are not environmentally acceptable. In agriculture, particularly in large-scale animal maintenance, the excrement increasingly poses a particular problem, since the great quantities of the latter can only be employed partially—and not at all in strictly large-scale animal maintenance enterprises, such as chicken farms—for fertilizing the surfaces of one's own enterprise. Moreover, various rationalization measures, such as liquid waste removal, have as consequence that the agricultural animal excrement results to an increasing degree in pumpable form as liquid manure; however, in liquid manure fertilization, the dissolved components are easily washed out and lead to contamination of the groundwater and the receiving water. The strong odor, particularly from fowl and pig liquid manure, leads to severe odor problems for the residents in residential areas. The problem of hygiene also takes on increasing significance in continuous, heavy liquid manure fertilization: e.g., it is known that salmonella in liquid cow manure is not destroyed even after yearlong storage.

In the forefront of the efforts to solve the problems in the economical and ecological sense is the processing of the resulting organic products and excrement in such a way that economical methods are applied, on the one hand, for supplying one's own operations with fertilizer and, on the other, for producing a salable commercial fertilizer from the raw products when there is a surplus, whereby no additional environmental load may occur and the products are hygienically acceptable and the foodstuff is stabilized. Thus, for example, moist compost or other moist substrates are very well suited as commercial fertilizer. The only disadvantage is that the latter must be used relatively quickly, since, in the moist state, a gradual loss of weight and volume results through continued biological decomposition. Also, the moist compost has a large weight and, as commercial fertilizer, has disadvantages due to high transportation costs and its storage and transportation is connected with high costs. Therefore, it is advantageous if the commercial fertilizer produced from surpluses is in dry form. Only a lengthy fermentation process in the mesophilic temperature range over 40° C. or a brief hot fermentation of at least 4 days at temperatures over 65° can achieve the required hygienic level. The disadvantage of carrying out these high temperatures through heating by means of commercially available means, such as oil, and the like, is the high cost in energy. Moreover, excessive drying temperatures cause considerable losses in volatile nitrogen compounds. Aeration treatment of liquid manure also causes excessive costs and losses in foodstuff without being able to put the product into commercial form.

A series of suggestions have already been made to overcome these problems. Various attempts have also been made to convert solid waste, particularly from large-scale animal maintenance, e.g., poultry excrement, into commercial compost by means of composting on stacks. This lengthy stack composting requires repeated transferring, protection from rain or deliberate moistening, if too severely dried out, and a large surface area, which must under all circumstances be structurally secured, all of which brings about high costs in material and labor, so that this method cannot be instituted.

Natural or mechanical separation of solids, such as the removal of floating and sinking layers, filtering, screening or centrifuging, likewise cause high costs without meeting the above-mentioned strict conditions required for a commercial product.

An effective hot fermentation, with temperatures reliably over 65° C. for at least 4 days, can only be achieved with exactly proportioned aeration of the fermentation stack. The stack must be circulated twice daily if possible during this period in order to bring the cooler outer layers into the area of the high temperatures as well. Naturally, this high expenditure in labor can be avoided in insulated throughflow mechanisms; but the costs for the expenditure in labor and for the mechanism are very high here as well.

Circulating mechanisms in the form of rotary drums or sliding grate mechanisms are already known. These mechanisms are very expensive due to the extensive mechanical aggregates, which must be protected against corrosion; they cannot be put into operation to any considerable extent in agriculture, or the like, because of the cost alone.

It has also already been attempted repeatedly to derive and make use of the heat from aerobic hot fermentation processes. The simplest way to derive the heat consists in conducting the forced aeration of the fermentation stack through heat exchangers. If large stacks are fermented in this manner in the mesophilic range to approximately 45° C., then the method can indeed be carried out, but the heat can only be used to supply low-temperature heating systems because of the low temperature level. The stacks dry out easily, since, along with the heated air, considerable quantities of water are carried out of the stack. A recycling of the heat exchanger condensation product is very difficult because high technological expenditure is required to distribute it uniformly. The higher the stack temperature is maintained, e.g., to improve the hygienical process, the more difficult the problem of drying out or remoistening, respectively.

The derivation of heat from aerobic fermentation stacks by means of internally or externally located heat exchangers is impeded in that the layers of contact between the fermentation stack and the heat exchanger surfaces cool faster than the heat can be resupplied from the depth of the stack. The temperature can be up to 20° C. higher at a distance of 20 to 30 cm from the immediate contact layer. However, with high stack temperatures of 65°–75° C., there is an advance running water temperature of only 40° to 45° in the heat exchanger, which is not sufficient for, e.g., supplying normal hot water heating systems.

It has also already been attempted to overcome these difficulties by providing relatively small exchanger surfaces in very large stacks, so that the heat flow in the direction of the heat exchanger can be improved, or by keeping the temperature drop between the stack and the heat exchanger slight. However, in both cases, the available heat capacity per quantity unit of the stack was so reduced that such systems were abandoned for reasons of cost.

The fermentation stack has also been circulated in such a way that it slides along the exchanger surfaces. This occurs in one type of system in that the fermentation material is repeatedly removed from beneath an index or register of surface heat exchangers and returned again from above. The cooled contact layers are thereby mixed in again; but the above-mentioned problems of not contacting the contact area can only be improved when the entire compost substance is continuously circulated as a whole with a considerable expenditure of energy. This requires a high expenditure of energy and these circulating systems are not suited for through-flow mechanisms because the material through-flow is constantly interrupted and must even be reversed.

SUMMARY OF THE INVENTION

The invention therefore has the object of proposing a method and the appertaining devices for aerobically fermenting organic materials and excrement, with which the above-mentioned organic products and excrement are universally converted at a low cost and in a simple manner by means of hot fermentation into valuable, hygienically acceptable and commercial, natural fertilizer and the heat resulting therefrom at a temperature level higher than 50°, if possible, can be carried away and used profitably.

This object is met inventively, in accordance with the method of the present invention, in that the material to be fermented is inserted in a shaft or shafts or in a pipe or pipes which pass it through for fermentation by means of gravitational force or by means of transporting devices, wherein heat exchanger units form the bottoms of the shafts or the shafts or the pipe or pipes are rinsed by heating water, or the like, and wherein the layer of material located at any time at the heat delivery surfaces is mixed in uniformly at intervals or, with a correspondingly low speed, continuously mixed into the entire material layer. It is advantageous here that the mechanisms be completely thermally insulated externally.

It is particularly economical and advantageous that the heat energy quantity of the fermenter not required for heating purposes, or the like, be used for drying the fermentation product separated out of the fermenter, wherein the heat output is automatically conducted, entirely or in part, for drying when it is not used for heating purposes, or the like.

In accordance with the device, of the present invention an inclined shaft or a plurality of such shafts are provided, whose inclined walls are formed by heat exchanger plates and in which an emptying element, preferably in the form of a scraper floor moving perpendicularly with respect to the walls, is provided at the underside of the open shafts, so that the material automatically slides down by means of gravitational force when the emptying element is switched on; and wherein chain drives, which extend from top to bottom and carry mixing angles along the entire width of the walls, are arranged around the inclined heat exchanger plates, wherein the chain drives are briefly switched on, according to need, in such a way that at least one mixing angle on the side on which the material lies brushes this side entirely from the bottom to the top, lying over the heat exchanger plates.

DESCRIPTION OF THE PREFERRED EMBODIMENTS

It is particularly favorable that the shafts be arranged at an angle of approximately 45°–70° relative to the horizontal plane in accordance with the pourability of the material to be fermented.

The mixing angles, arranged at a rearwardly directed angle relative to the inclined shaft walls, produce a back-up when the fermentation material rises, by means of which back-up the cooled layer of fermentation material contacting the walls is pressed deep into the fermentation material of the shaft, in a portioned manner, under the effect of the back-up and is accordingly mixed in, wherein fermentation material of a higher temperature reaches the walls of the heat exchanger plates behind the angle. It is preferably carried out in such a way that the rearwardly directed clearance angle of the mixing angle is approximately 30° and its height amounts to approximately 15% of the shaft height, but at least approximately 40 mm.

It is important that the shafts not be completely filled with material, but only approximately 80–90%, so that no fermentation material contacts the rear side of the shaft wall, but rather that this space be available in order to permit the mixing process to take place without disturbances or friction obstacles and the mixing angles on the rear of the heat exchanger plates are accordingly guided back into a space which is free of material. In so doing, the plates receive radiant heat from the material of the underlying shaft via their rear sides.

The fermentation material can be fed into the shafts from above by means of a fan; or this can be done in such a way that the fermentation material can be fed into the shafts via a scraper floor which is continuously moved horizontally back and forth over the shaft openings in such a way that the shafts are filled up to 80–90% in a uniform manner.

It is further suggested, according to the invention, to provide a preheating space above the heat exchanger plates for the fermentation material, so that the cold material does not cool the heated water of the heat exchanger plates.

In another preferred embodiment the fermenter is composed substantially of a horizontally or approximately diagonally arranged hollow body, which is cylindrical or round only in its lower half, in which hollow body a rotating feed element—preferably, an interrupted, so-called paddle worm—is arranged; and wherein a filler neck is provided on an outer front wall and a discharge neck is provided on the other side for the fermentation material, wherein the fermenter is continuously filled only up to 70% of the entire filling level, which is necessary in order that the mixing process be ensured through constantly breaking off, turbulent movements in the respective top layer during rotation of the paddle worm; and wherein the fermenter is rinsed by the heat carrier, e.g., heating water.

In another area of application, such a fermenter is filled with liquid manure as a heat carrier in which, by means of the heating, the process heat is accordingly supplied for a biogas fermentation. In this case, it is favorable if the material is composed of a mixture of solids rich in carbohydrates, e.g., ground straw and biogas liquid manure free from gas. It is advisable, here as well, to proceed in such a way that the entire mechanism is completely thermally insulated externally.

It is suggested, according to the invention, to construct the filler and output shafts in such a way that they are closable by means of flaps, or the like, so that hot interior air cannot escape outwardly in the intervals between filling and removal of fermentation material; in particular, so that no draft occurs.

The fresh air supply and, accordingly, the oxygen supply required for the fermentation is controlled, according to a preferred embodiment, in that the hot air is removed from above the fermentation material and again fed from below to the fermentation material after it has been mixed with the appropriate quantity of fresh air. In order to compensate the fresh air portion, the corresponding quantity of old air can thereby escape via discharge holes, or the like, by means of the resulting overpressure, or the excess old air is separated out in a controlled manner; wherein it transmits its removable heat energy quantity, via a heat exchanger, to the fresh air to be fed. This air circulation and air supply and output can be controlled and achieved through controlled heat uplift by means of a so-called thermosiphon system, known per se, or through a driven exhaustor or turbo-compressor with appropriate controls, wherein the controls can be carried out as controlled by a computer program.

The advantages aimed at with the invention consist particularly in that all organic waste products, as well as corresponding produce cultivated for fermentation, can be employed in small, medium or large systems, according to the invention, in a particularly economical manner and with a good degree of efficiency for producing heat and, accordingly, for economizing on other energy stocks, particularly fossil energy stocks; and wherein, moreover, high-grade fertilizer can be produced from the environmentally burdensome organic waste materials and excrement for one's own use in agricultural and related operations, or a highgrade grade fertilizer can be produced as a secondary source of income, both of which fertilizers are hygienically acceptable and contain great fertilizing power, which is of particular value in terms of national economy, since the raw material in this fertilizer previously usually decomposed without being utilized or loaded the environment unfavorably, respectively.

If the fermenter is rinsed by a mixture of solid material rich in carbohydrates, e.g., ground straw and liquid manure which has been freed of gas, then the biogas portion of approximately 30–50% previously required in all known biogas methods is economized for process heating.

The separated fermentation material is salable in moist as well as in dry state, wherein it is suited chiefly for immediate use in the moist state and is particularly wellsuited as commercial fertilizer in the dry state.

Figure 1:
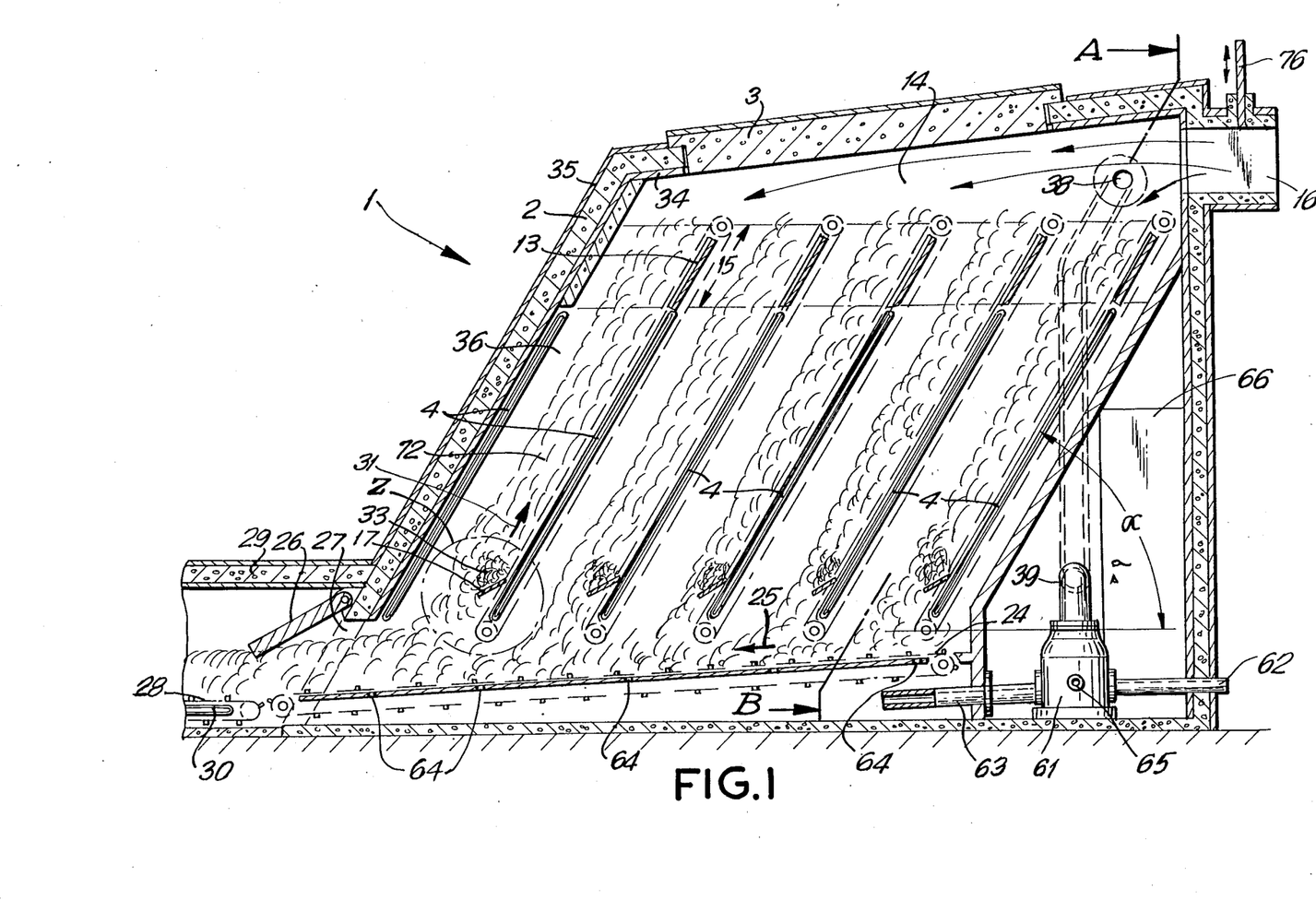
FIG. 1 is a cross-section through a fermenter with inclined shafts.
Figure 2:
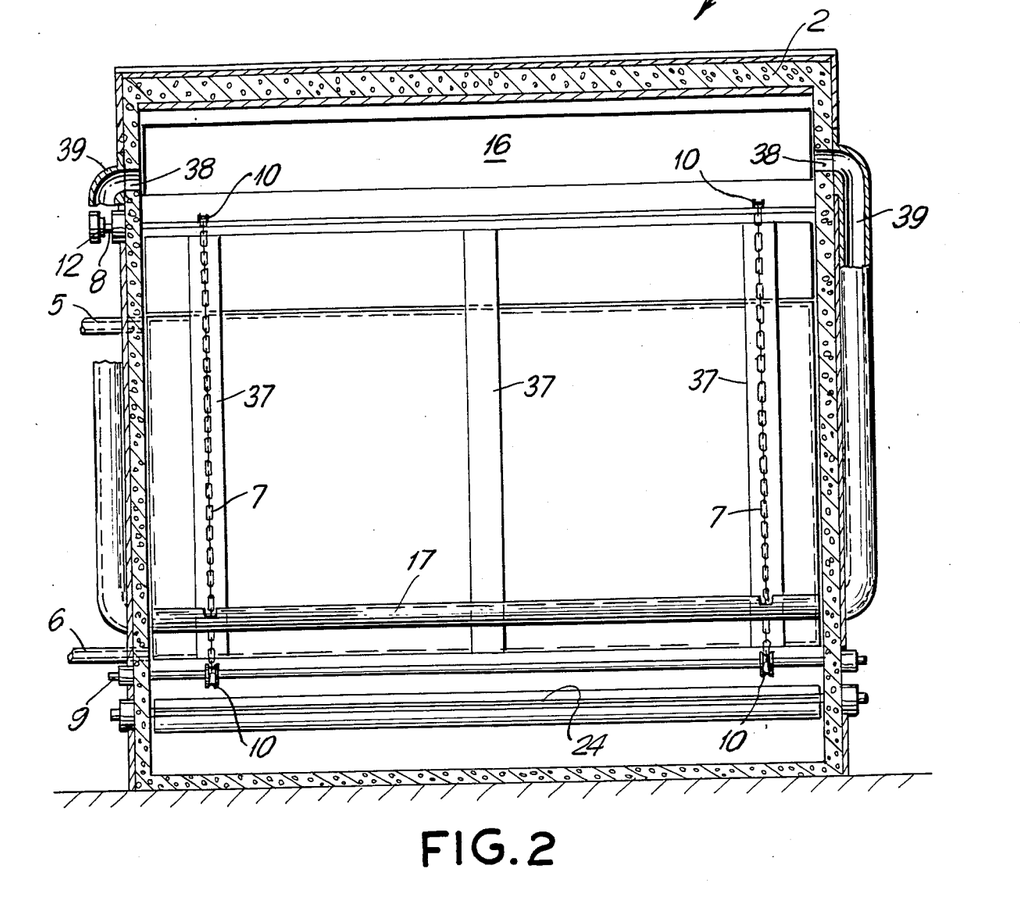
FIG. 2 is a cross-section according to section line A–B in FIG. 1.

Referring to the drawings and particularly FIG. 1, the shaft fermenter 1 is composed substantially of a housing 2, which can be produced from concrete or gas concrete, respectively, or from a wooden construction or of plastics material, respectively, wherein the cover 3 is provided along the entire width and serves to mount the heat exchanger plates 4 with all the other parts housed in the interior; wherein the heat exchanger plates 4 are fastened on the side walls and the inflow and outflow pipes 5 and 6 for the water in the heat exchanger plates 4 also exit here from the housing 2. Two chain drives 7 are arranged around the heat exchanger plates 4 and their upper and lower shafts 8 and 9, respectively, are likewise supported in the housing. The chain wheels 10 are arranged on the shafts and the link chains 11 are driven over the chain wheels 10, wherein the drive of the shaft 8 is effected via the clutch 12 by a drive assembly, not shown. By means of this construction there are no bearings within the housing of the shaft fermenter 1 for the shafts 8 and 9 of the chain wheels 10 and, accordingly, they are not subjected to corrosive influences, or the like. Beneath the upper input area 14 of this housing 2, dividing walls 13 are provided which are arranged coextensively with each of the heat exchanger plates 4. The inserted fermenting material 72 is heated up in this area 15 of the shaft fermenter 1 after several hours of being in the fermenter so that the cold material supplied from the outside does not contact the heat exchanger plates and thereby cool the liquid located therein. During filling, e.g., via the filler shaft 16 by means of a fan, or the like, the shafts can be filled in area 15 almost entirely with the material to be fermented, which material is initially loose. Through the settling of the material, the shafts are filled here not more than 90% full.

Figure 3:
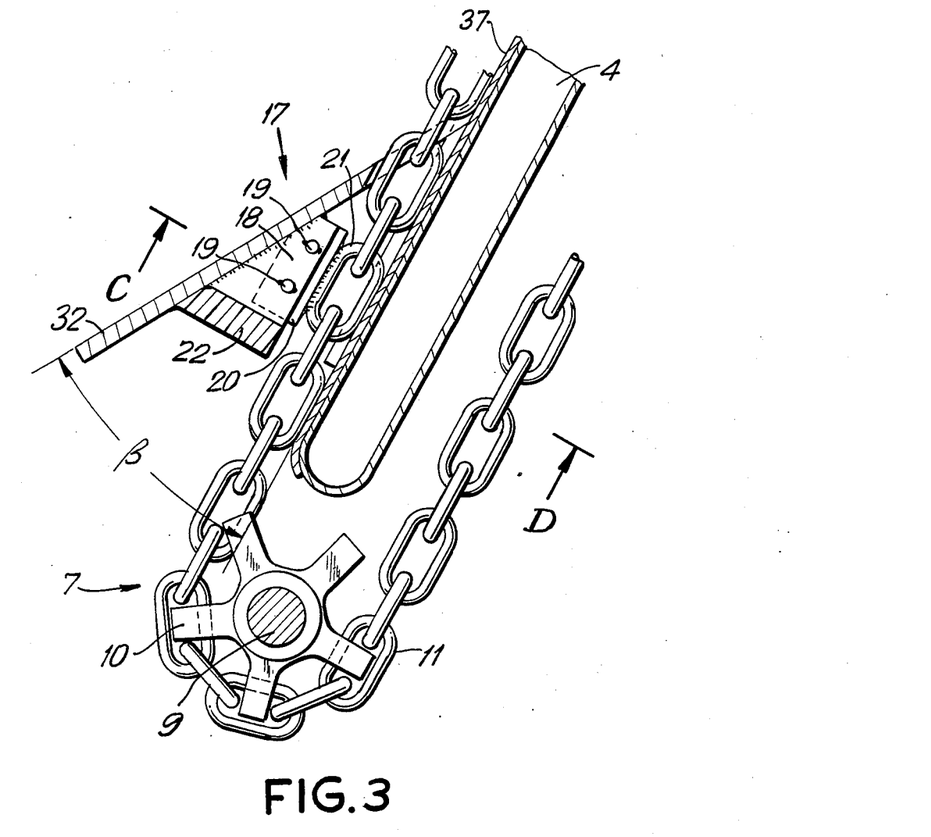
FIG. 3 is the unit Z according to FIG. 1.
Figure 4:
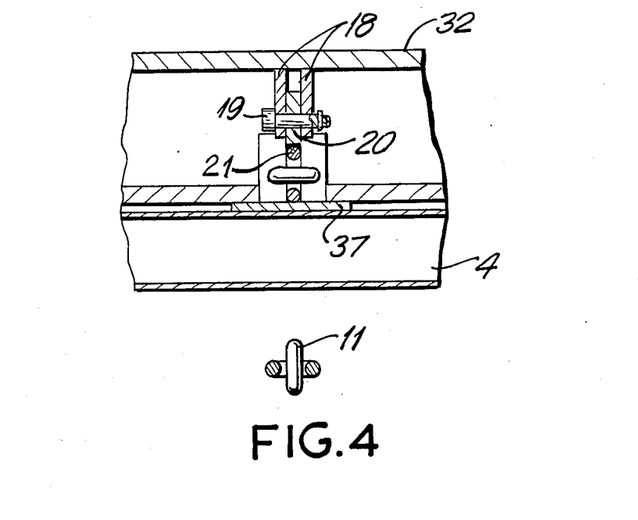
FIG. 4 is a cross-section according to section line C–D in FIG. 3.

The mixing angle 17 is connected with the chain drives 7 as shown in FIGS. 3 and 4 in detail. The mixing angle 17 is interrupted in the lower area in the positions of the chains and has two web plates 18 in which two holes are worked in and in which bolts 19 are inserted, which bolts 19 are likewise inserted in the corresponding holes of the clip 20 which is fastened at the perpendicularly arranged chain member 21. A secure fastening of the mixing angle 17 is thereby ensured. The weakening of the mixing angle 17 caused by the opening for the chain can be compensated, e.g., by means of the rear bridge 22. The chain wheels 10 can be the usual commercial kind by means of this manner of arrangement.

The heat exchanger plates 4 are arranged diagonally at an angle $\alpha$ of approximately 60° from the horizontal plane. The fermentation material is thereby still well supported on the heat exchanger plates 4 and still slides downward automatically when the already fermented material located on it is removed from the shaft fermenter 1 in the direction of arrow 25 via the scraper floor 24. In order to remove the fermented material, the scraper floor 24 takes along the material lying on it and presses it against the closing flap 26, which is arranged so as to swivel, so that the latter opens, as demonstrated, in the position shown. The scraper floor 24 to the output shaft 27 is provided so as to be located at a lower level outwardly so that the material flowing out of the individual shafts has the necessary free space.

One can also house the scraper floor 24 entirely within the housing 2 of the shaft fermenter 1 and the closing flap 26 is conveyed out and completely closes off the housing when no material exits from the output shaft 27. Additional devices can be provided in connection with the output shaft 27; another scraper floor 28 is indicated here, which is located in a connected housing 29, in which, e.g., heat exchangers 30 are arranged in the area of the scraper floor 28, which heat exchangers 30 effect the drying of the separated fermentation material.

The angle plate 32 of the mixing angle 17 is adjusted at an angle $\beta$ of approximately 30° relative to the surface of the heat exchanger plates 4, whereby during the movement of this mixing angle 17 in the direction of arrow 31, a back-up 33 of the layer of fermentation material which is located on the heat exchanger plates 4 and is cooled by means of the exchange of heat, is formed by means of the angle plate 32 of the mixing angle 17. The fermentation process itself is slowed down or interrupted, respectively, by means of this cooled layer which provides a thermal insulation of the hot fermentation material relative to the heat exchanger plates 4.

By means of the back-up 33, the material of this abovelying layer is pressed deep into the other fermentation material, which is substantially hotter, resulting in a deep and intensive mixing of the cooled layer in the hotter layer. The back-up 33 ceases from time to time during the continued rise of the mixing angle 17 when the latter has reached a corresponding height. Before this, hot fermentation material trickles steadily on the heat exchanger plates 4 behind the back-up 33.

In a preferred embodiment sliding rails 37 are arranged on the heat exchanger plates 4 and the dividing walls 13, on which sliding rails 37 the chains and mixing angle 17 are supported.

According to the course of the fermentation process, the mixing angles 17 are moved in the entire length of the heat exchanger plates 4 in shorter or longer time periods, respectively, e.g., every one or two hours, so that the fermentation material 72 is exchanged at regular intervals. The mixing angle 17 can also be driven continuously with a correspondingly lower speed. The magnitude of the clearance angle $\beta$ of the mixing angle 17 depends on the pourability of the fermentation material employed and can oscillate, e.g., between 25° and 45° according to operating conditions.

The housing walls can be protected internally and externally by means of insulation layers 34 and 35, so that heat losses through radiation result only in a limited manner.

The hot air in the input area 14 is removed by the turbo-compressor and the mixer 61 via holes 38 and pipeline 39 and mixed with fresh air, which is sucked up via pipe 62 and blown into the space 64 beneath the scraper floor 24 by means of the pipe 63. From here this air reaches the fermentation material 72 in the shaft 36 (which fermentation material 72 lies on the scraper floor 24) through the holes 64 of the scraper floor 24. The excess waste air reaches outside via the pipe 65. The space 67 can be entered via the door 66; the shaft 16 can be closed with the slider 76 in that it can be moved up and down.

All switching and controls, such as the filling and separation of the material, moving the mixing angle, the removal of the heating water, the drying of the separated material, and the like, can be effected manually or via auotmatic program controls. The method of the present invention can also be carried out by means of the fermenter 40, in accordance with FIG. 5.

Figure 5:
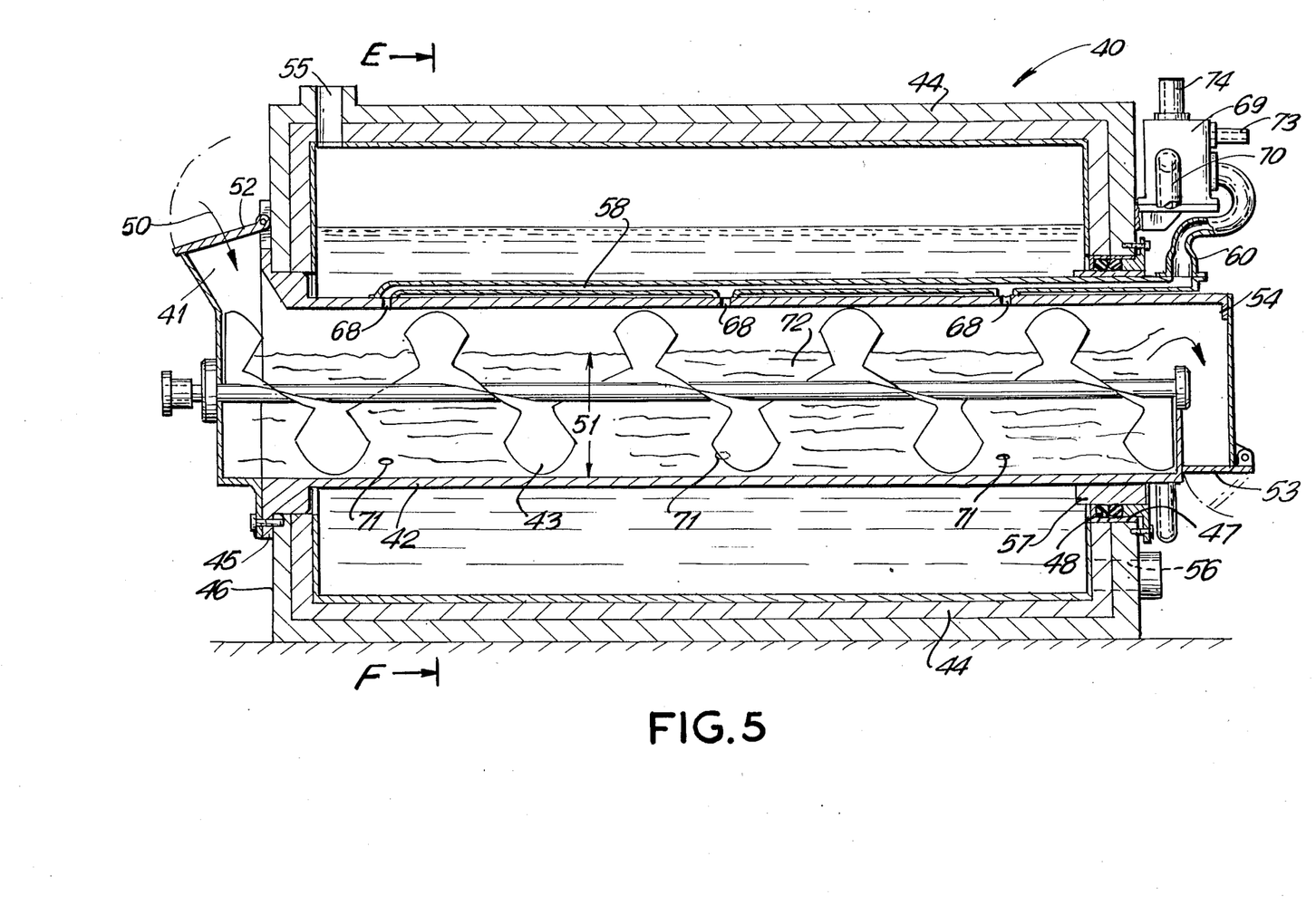
FIG. 5 is a cross-section through a fermenter which is substantially composed of a hollow body located on a horizontal plane in which hollow body a transporting means is arranged, and which is rinsed by a heat carrier, e.g., water or liquid measure.
Figure 6:
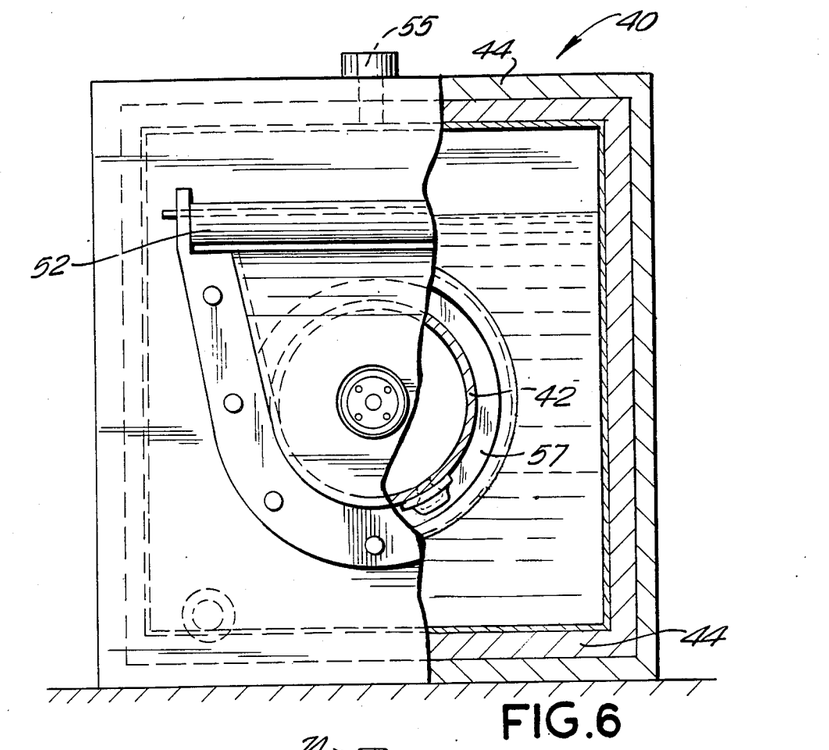
FIG. 6 is a side view according to FIG. 5, partially cut away.
Figure 7:
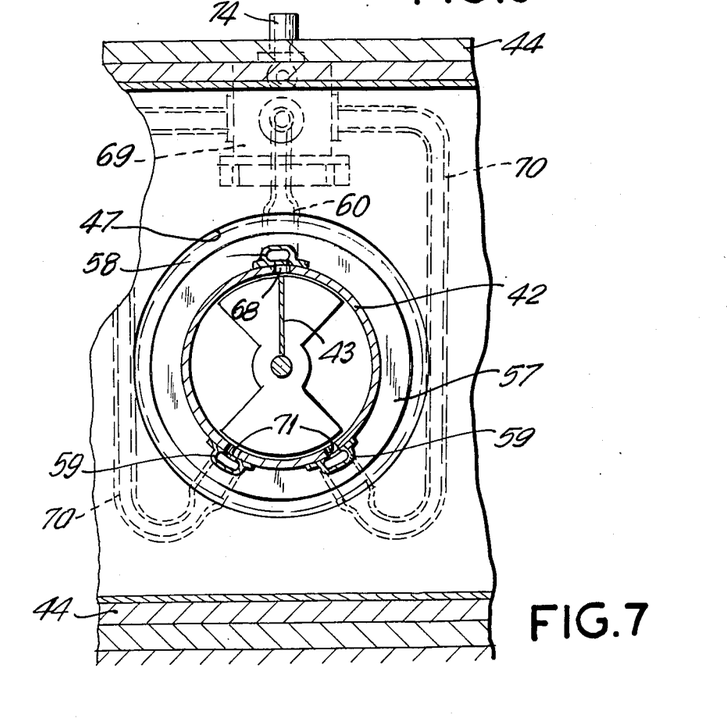
FIG. 7 is a cross-section according to section line E–F of FIG. 5.

In the embodiment example according to FIGS. 5 and 6, the fermentation material is supplied to the pipe 42 via a filler neck 41, in which pipe 42 a paddle worm 43 is arranged so as to rotate, wherein the paddle worm according to FIG. 7 is an interrupted worm. The pipe 42 is arranged in the housing 44 in that it is connected, for example, by its flange 45 with the outer front face 46 via screws in such a way, known per se, that a seal is effected for the water present in the housing in that a seal, known per se, is arranged between the flange 45 and the outer front face 46. At the other side of the housing 44, the latter has an outwardly enlarged hole 47 for the pipe 42 to pass through, into which hole 47 a seal 48 is inserted, which is braced by means of a pressed in sealing ring flange 49, whereby an effective seal is achieved. The pipe can thereby be easily removed from the housing and reinserted in the converse manner, without great expense, for cleaning or repair, or the like.

The material to be fermented is inserted, according to arrow 50, via the filler neck 41 manually or via mechanical feed systems of a known type and it is taken up by the paddle worm 43 during rotation of the latter, so that the pipe is filled.

During filling, only so much material is supplied, in relation to the rotation of the paddle worm 43, that the pipe is only filled approximately to the filling height 51, which approximately corresponds to a filling degree of 70%. Thereafter, during continued rotation of the paddle worm 43, the material is constantly lifted on one side, either at determined intervals or in a very slow, continuous manner, until it falls from the resulting upper edge of material, after exceeding the angle of incline, in a portioned manner so as to be distributed on the top layer. Accordingly, the material of the outer, cooled layer is constantly mixed with the inner, hot contents.

For those times when the fermentation material is neither filled nor removed, the interior of the pipe 42 is closed outwardly by means of the closing cover 52 at the filter neck 41 and the closing cover 53 at the discharge neck 54, so that the hot air in the pipe 42 is not exchanged with cooler air from outside.

Should this fermenter be utilized to produce heating water, the pipe 42 is rinsed by the water in the housing 44, which water flows through the supply neck 55, according to need, and is removed via the emptying neck 56.

In this embodiment example, a single pipe can be provided in the housing; for larger systems a corresponding plurality of such pipes, arranged next to or above one another, can be considered.

In place of heating water, e.g., liquid manure can be filled in the housing 44 for rinsing the pipe 42, as already described.

The ring 57 is securely placed on the pipe 42; the pipelines 58 and 59 are guided through it. The neck 60 is connected at the pipeline 58. The holes 68 in the upper area of the pipe 42 are likewise connected at this pipeline 58. Hot air, which accumulates above the fermentation material 72, escapes from the pipe 42 via the holes 68, or it is sucked up via the neck 60 by the turbocompressor and mixer 69 and, for there, is pressed into the two pipelines 59 via the pipes 70, from which pipelines 59 it penetrates via the holes 71. The fresh air portion required for the fermentation process reaches the turbocompressor and mixer 69 via the pipe 73, wherein the old air portion is separated out via the pipe neck 74.

I claim:

1. A method for the aerobic fermentation of solid organic materials, such as agricultural and foodstuff waste products, including excrement, and the simultaneous production of heat and high-grade, hygienically acceptable fertilizer, comprising feeding the material to be fermented into at least one shaft and conducting the material through the at least one shaft, the at least one shaft comprising heat exchanging means, the material conducted through the at least one shaft forming a layer adjacent the heat exchanging means and a layer away from the heat exchanging means, mixing the layer adjacent the heat exchanging means into the layer away from the heat exchanging means, the shafts being mounted in an enclosed, thermally insulated housing, the housing having a top portion and a bottom portion, withdrawing hot air produced by the fermentation process from the top portion of the housing, adding fresh air to the hot air and introducing the hot air into the bottom portion of the housing underneath the material to be fermented, and removing the fermented material from the housing.

2. The method for the aerobic fermentation according to claim 1, wherein the heat energy quantity of said fermenter (1, 40) not required for heating purposes, is used for drying the fermentation product separated out of said fermenter, wherein the heat output is conducted for drying by means of manually operated or automatically controlled switching mechanisms when said heat output is not used for heating.

3. The method according to claim 1, wherein the layer adjacent the heat exchanging means is mixed continuously into the layer away from the heat exchanging means.

4. The method according to claim 1, wherein the layer adjacent the heat exchanging means is mixed in regular intervals into the layer away from the heat exchanging means.

5. The method according to claim 1, wherein the at least one shaft is inclined and the material is conducted through the at least one shaft by force of gravity, the heat exchanging means being a heat exchanger plate forming a bottom wall of the at least one shaft.

6. The method of claim 5 wherein the solids rich in carbohydrates are ground straw or biogas liquid manure free from gas.

7. The method according to claim 5, wherein the at least one shaft is filled only to approximately 90% of its inner width.

8. The method according to claim 1, wherein the at least one shaft extends horizontally and the material is conducted through the at least one shaft by means of transporting devices, the at least one shaft being formed by a pipe, the heat exchanger means being liquid flowing around the pipe.

9. The method according to claim 8, wherein the material is filled into the at least one shaft to a filling degree of approximately 70%.

10. The method according to claim 8, wherein the liquid is liquid manure, the material to be fermented being a mixture of solids rich in carbohydrates.

11. The method according to claim 1, wherein the hot air with added fresh air is conducted to the bottom portion by force of gravity.

12. The method according to claim 1, wherein the hot air with added fresh air is conducted to the bottom portion by force of a thermosiphon system.

* * * * *